United States Patent [19]

Iizuka

[11] Patent Number: 5,179,398
[45] Date of Patent: Jan. 12, 1993

[54] PROJECTOR AND IMAGE ADJUSTMENT METHOD

[75] Inventor: Takashi Iizuka, Tokyo, Japan

[73] Assignee: Asahi Kogaku Kogyo Kabushiki Kaisha, Tokyo, Japan

[21] Appl. No.: 769,254

[22] Filed: Oct. 1, 1991

[30] Foreign Application Priority Data

Oct. 1, 1990 [JP] Japan .................................. 2-263652
Sep. 12, 1991 [JP] Japan .................................. 3-233164

[51] Int. Cl.⁵ ........................ G03B 21/14; G03B 3/00
[52] U.S. Cl. ........................................ 353/30; 353/34; 353/37; 353/101
[58] Field of Search ...................... 353/30, 31, 33, 34, 353/37, 81, 82, 100, 101, 98, 99, 102, 69, 122; 359/40, 83

[56] References Cited

U.S. PATENT DOCUMENTS

| | | | |
|---|---|---|---|
| 4,861,142 | 8/1989 | Tanaka et al. | 353/37 |
| 4,981,352 | 1/1991 | Tejima et al. | 353/31 |
| 4,989,954 | 2/1991 | Yokoyama et al. | 359/40 |
| 5,047,847 | 9/1991 | Toda et al. | 359/40 |
| 5,060,058 | 10/1991 | Goldenberg et al. | 353/34 |

*Primary Examiner*—William A. Cuchlinski, Jr.
*Assistant Examiner*—William C. Dowling
*Attorney, Agent, or Firm*—Sandler, Greenblum & Bernstein

[57] ABSTRACT

Light beams containing image information from a plurality of liquid crystal panels are converged by condensing lenses. The converged light beams are combined by dichroic mirrors and projected onto a screen by a single projecting lens. The liquid crystal panels and condensing lenses are supported by an adjusting unit, and can be moved independently, in the direction of their respective optical axes.

10 Claims, 4 Drawing Sheets

PROJECTOR AND IMAGE ADJUSTMENT METHOD

BACKGROUND OF THE INVENTION

1. Field of the Invention

This invention concerns a projector for combining several light beams to project images on a projection surface, and in particular, an apparatus and method capable of correcting focusing error and magnification error on a projection surface.

2. Description of the Prior Art

A conventional liquid crystal color projector forms images of three primary colors on three liquid crystal panels, and the images are superimposed on a screen. In this type of liquid crystal color projector, light beams of each color are combined by means of a dichroic prism or a dichroic mirror, and the combined light beam is projected on a screen by a single projecting lens.

In such a projector, wherein images of different colors on separate liquid crystal panels are superimposed, the images of each color may not coincide properly on the screen due to assembling errors.

Such errors can be prevented by increasing the precision of each optical device in the assembly, or by correcting the errors by performing adjustments after assembling. In the former method, however, the optical devices are more costly and the assembling process is more difficult, so in general the latter method, i.e. adjustment after assembling, is employed.

The focusing error of the whole image can be corrected by adjusting the projecting lens or the screen disposed in the common part of the optical paths.

However, if there are relative focusing errors, magnification errors or other errors in the images, the optical system must be adjusted independently for each color.

SUMMARY OF THE INVENTION

The present invention was conceived to overcome the above problems, and aims to provide a projector wherein a plurality of images are superimposed to form an image, and each image can be adjusted independently.

To achieve the aforesaid object, the projector of the present invention is characterized in that it comprises a plurality of image forming devices, a plurality of condensing lenses corresponding to the image forming devices which converge the light beams from the image forming devices and a single projecting lens which projects the images converged by the condensing lenses onto a projection surface. A light beam combining device is provided between the condensing lenses and the projecting lens which combines the light beams from the image forming devices and causes them to impinge on the projecting lens, and a plurality of adjusting devices are provided independent of the image forming devices and the condensing lenses, which are supported such that they are free to move in the direction of the optical axis.

In accordance with a further object of the present invention, an image-adjusting method of using a projector is provided which comprises at least a step of moving the image forming devices in the direction of the optical axis to adjust the focus, and a step of moving the condensing lenses in the direction of the optical axis relative to the image forming devices to adjust the magnification.

DETAILED DESCRIPTION OF THE EMBODIMENTS

Figure 1:
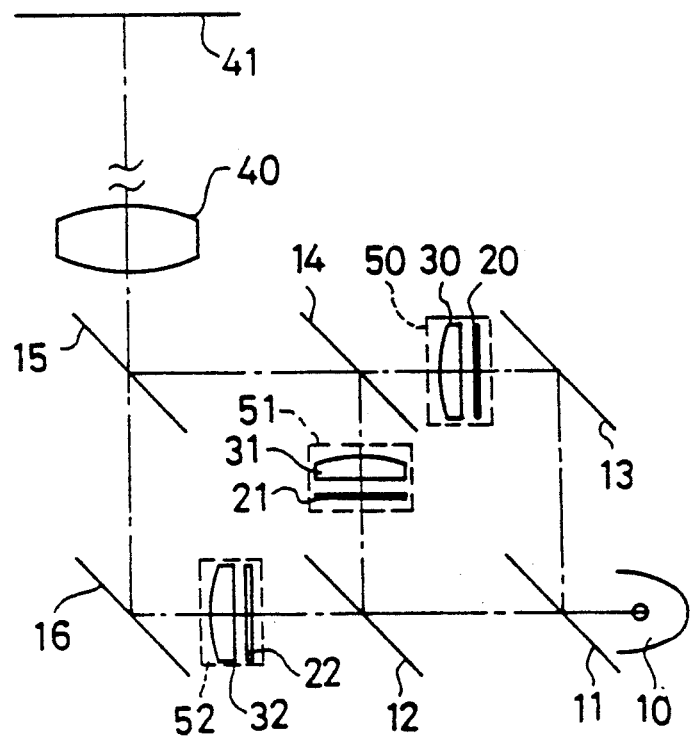
FIG. 1 depicts an optical system illustrating a first embodiment of the projector of the present invention.

The embodiments of the present invention will now be described hereinafter with reference to the drawings.

FIGS. 1-4 illustrate a first embodiment of the projector of the present invention.

A parallel white light beam from an optical source 10 is separated into light of three wavelengths, i.e. into light beams of three colors, by a first of two dichroic mirrors 11, 12. These light beams impinge on liquid crystal panels 20, 21 and 22 which act as image forming means that form images corresponding to each color. The R (red) component light beam reflected by the first dichroic mirror 11 is deflected by a mirror 13, and impinges on a liquid crystal panel 20. The G (green) component light beam, after reflection by the second dichroic mirror 12, impinges on a liquid crystal panel 21. The B (blue) component light beam, after passing through the first and second dichroic mirrors 11, 12, impinges on a liquid crystal panel 22.

The light beams which have passed through the liquid crystal panels are converged by condensing lenses 30, 31, 32 arranged close to the sides of the panels from which the light beams emerge, combined by a third and fourth dichroic mirror 14, 15 and a mirror 16 which act as a light beam combining means, and impinge on a projecting lens 40.

The condensing lenses 30, 31, 32 converge the light beams from the liquid crystal panels into the pupil of the projecting lens 40 so that they are efficiently made incident on the projecting lens 40.

The combined light beams impinging on the projecting lens 40 are projected by the lens onto a projection screen 41 so as to form color images. The liquid crystal panels 20, 21, and 22 are disposed in positions conjugate to the screen 41.

A liquid crystal panel and a condensing lens are provided in each adjusting unit 50, 51, 52, and each adjusting unit can be moved in the direction of its respective optical axis for adjustment purposes. The condensing lenses 30, 31, 32 are arranged within each adjustment unit so that they can be moved in the direction of its respective optical axis. The condensing lenses and liquid crystal panels can therefore each be adjusted independently in the direction of a respective optical axis.

To prevent wavefront aberration of the transmitted light, it is preferable that the dichroic mirrors are thin; however, if they are thin, precision errors due to curvature may arise easily. Further, if the dichroic mirrors are curved they effectively act as either convex or concave mirrors with respect to the reflected light. The degree of convergence of the light beam therefore differs from the design value, which causes image focusing and magnification errors on the screen.

Figure 2:
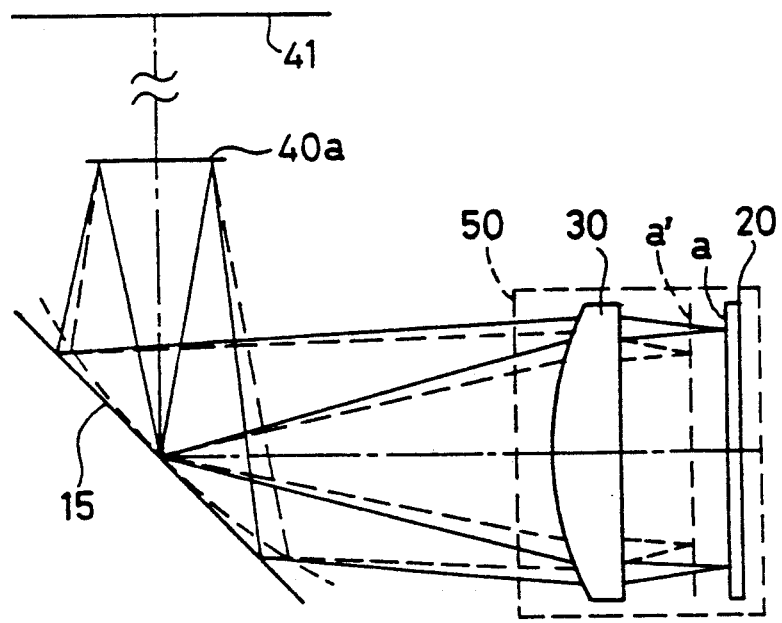
FIG. 2 illustrates the effect of curvature of the dichroic mirror on an image.

The effect of curvature of the dichroic mirrors on the image will be described with reference to FIG. 2. FIG. 2 depicts the relation between the dichroic mirror 15, the liquid crystal panel 20 and the condensing lens 30; the dichroic mirror 14 has been omitted. The symbol 40a in the figure represents the pupil of the projecting lens 40.

If the dichroic mirror 15 is deformed by curvature from the basic shape shown by the solid line to the shape shown by the dotted line in FIG. 2, it behaves as a concave mirror with respect to the G and R component light beams. As a result, a surface which is in a conjugate position to the screen is displaced from the solid line a to the dotted line a'. The initial position of the liquid crystal panel 20 is in a conjugate position a to the screen 41 when the dichroic mirror is a flat surface. The conjugate relation between the screen 41 and the liquid crystal panel 20 is upset by the curvature of the mirror 15, the G and R component images are put out of focus, and the sizes of the images are greater than that of the B component.

Figure 3:
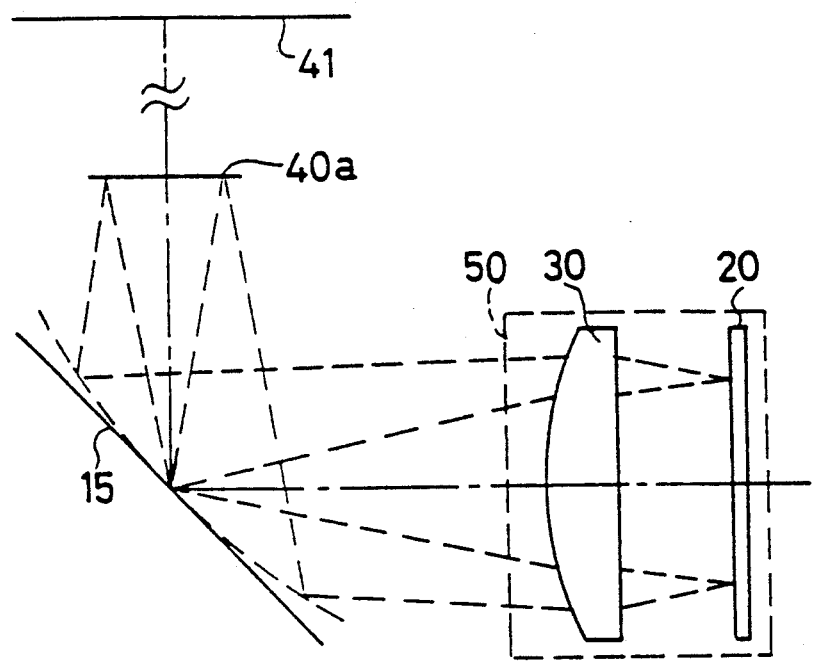
FIG. 3 illustrates a first step of adjusting the projector of FIG. 1.
Figure 4:
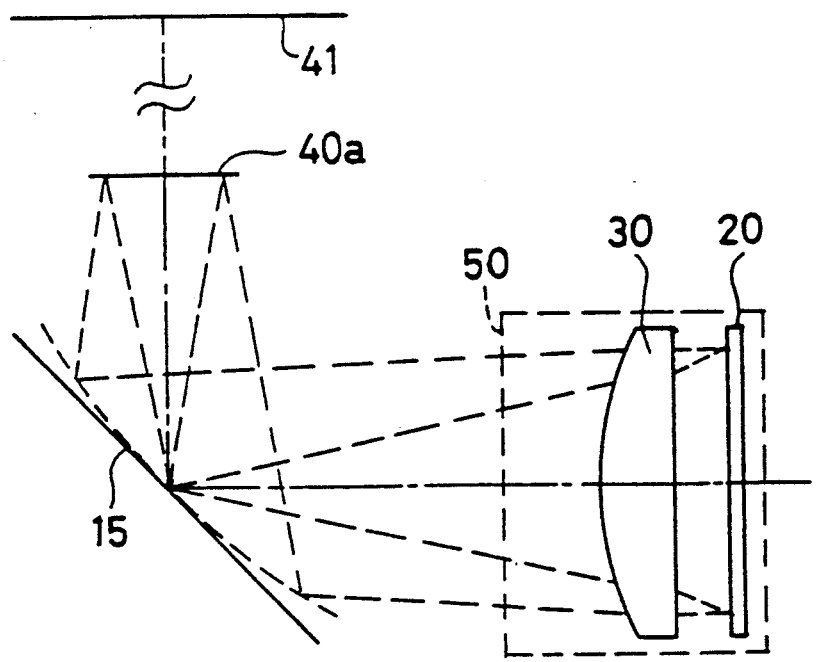
FIG. 4 illustrates a second step of adjusting the projector of FIG. 1.

In the projector of this embodiment, the adjusting unit 50 is moved integrally in the direction of the optical axis until the liquid crystal panel 20 is in a conjugate position to the screen as shown in FIG. 3. This adjustment corrects focusing errors on the screen. The magnification is then adjusted by moving only the condensing lens 30 in the adjusting unit 50 in the direction of the optical axis, as shown in FIG. 4.

As the condensing lens 30 is arranged very close to the liquid crystal panel 20, there is almost no effect on the focusing adjustment if only the condensing lens 30 is moved in the direction of the optical axis; thus, the magnification alone can be adjusted. These adjustments permit both image focusing and magnification errors to be; adjusted.

In this embodiment, the case has been described wherein focusing errors due to curvature of the dichroic mirror are corrected, but errors due to the arrangement or precision of other optical devices, or errors due to color aberrations of the projecting lens, can also be corrected.

Liquid crystal panels comprise cells filled with liquid crystals sandwiched between polarizing plates. It is known that if the incident light is not a parallel light beam, there may be some scatter in the transmittance due to differences in the incidence angle, depending on the characteristics of the liquid crystals.

If, however, a condensing lens is provided between the liquid crystal panel and the dichroic mirror as in the aforesaid embodiment, a parallel light beam is caused to be incident on the liquid crystal panel so there is no fluctuation in the amount of light transmitted which may be caused due to the angular dependence of the liquid crystals.

Further, since the light beam passing through the condensing lens is not only illuminating light but also a light beam containing image information, the performance of the condensing lens affects the aberrations and the performance of the projecting optical system.

Consequently aberrations due to the projecting lens can also be corrected by the condensing lens and the precision of the optical system can be increased. Further, as the residual aberrations of the projecting lens can be corrected by the condensing lens, high performance is not required of the projecting lens and the cost of manufacturing the projecting lens can be reduced.

If a condensing lens is arranged between the liquid crystal panel and the optical source, a focusing adjustment can be carried out by moving the liquid crystal panel but the magnification cannot be adjusted. Further, as the light incident on the liquid crystal panel is then convergent, fluctuations in the amount of transmitted light may occur.

Further, as the light beam passing through the condensing lens is then only illuminating light which does not contain any image information, there is no effect whatever on the aberrations and imaging performance of the projecting optical system, and consequently residual aberrations of the projecting lens cannot be corrected by the condensing lens.

As the dichroic mirrors also have an angular dependence, it is preferable that the degree of convergence of the light beams incident on the mirrors is small so as to limit fluctuations in the amount of light due to this dependence.

If the condensing lens is on the projecting lens side of the liquid crystal, the distance from the condensing lens to the projecting lens then less than in the case where it is on the optical source side, and the degree of convergence of the light beam is therefore increased. However, if a projecting lens having a long back focus is used as in the aforesaid embodiment, differences in the degree of convergence due to the position of the condensing lens are slight.

In the aforesaid embodiment the focusing adjustment is made by adjusting the liquid crystal and condensing lens as one assembly, and the magnification adjustment is made by adjusting the condensing lens separately. It is however possible to perform both the focusing and magnification adjustments by adjusting the liquid crystal and condensing lens independently.

Figure 5:
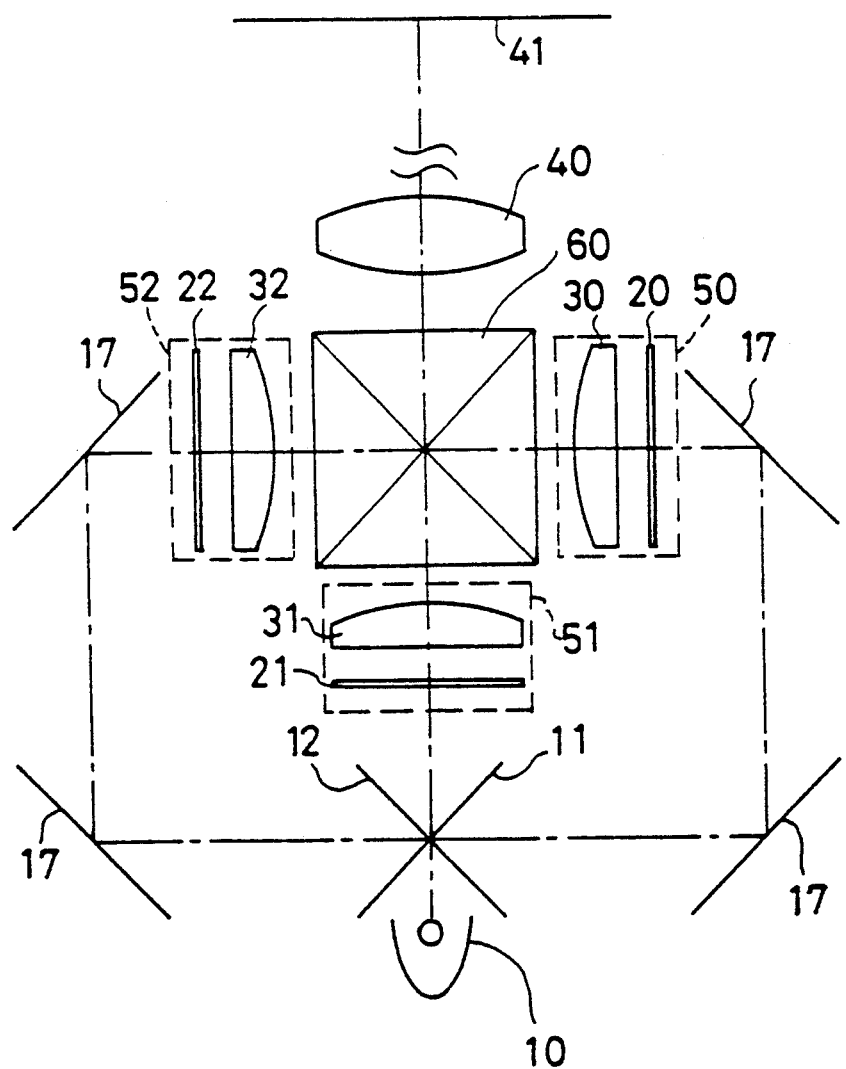
FIG. 5 depicts an optical system illustrating a second embodiment of the projector of the present invention.

FIG. 5 illustrates a second embodiment of the projector of the present invention.

In this embodiment, liquid crystal panels 20, 21, and 22 are provided which form images corresponding to the colors R, G, B, condensing lenses 30, 31, 32 which converge the light beams from these liquid crystal panels. Additionally, a projecting lens 40 is provided which projects the light beams that have passed through the condensing lenses onto a screen 41, and a dichroic prism 60 combines the light beams from these projecting systems and causes them to impinge on the projecting lens 40.

The light beams from the optical sources are separated into color components by dichroic mirrors 11, 12 which are mutually perpendicular to each other and pass through the liquid crystal panels and condensing lenses via mirrors 17. The light beams are combined by the dichroic prism 60 so as to impinge on the projecting lens 40.

The light beams incident on the projecting lens are projected on the screen 41 to form colored images.

In this embodiment, the liquid crystal panels and condensing lenses are installed in adjusting units 50, 51, 52. Each of these units may be moved integrally in the direction of their respective optical axis, and the condensing lenses inside the units may also be independently adjusted in the direction of the optical axis.

In the arrangement of the aforesaid second embodiment, image focusing and magnification errors due to curvature of the dichroic mirrors do not occur, but displacement of the images due to other factors such as, for example, errors in the initial setting position of the liquid crystals, or errors in the precision of the condensing lenses, can be corrected independently for each color.

Figure 6:
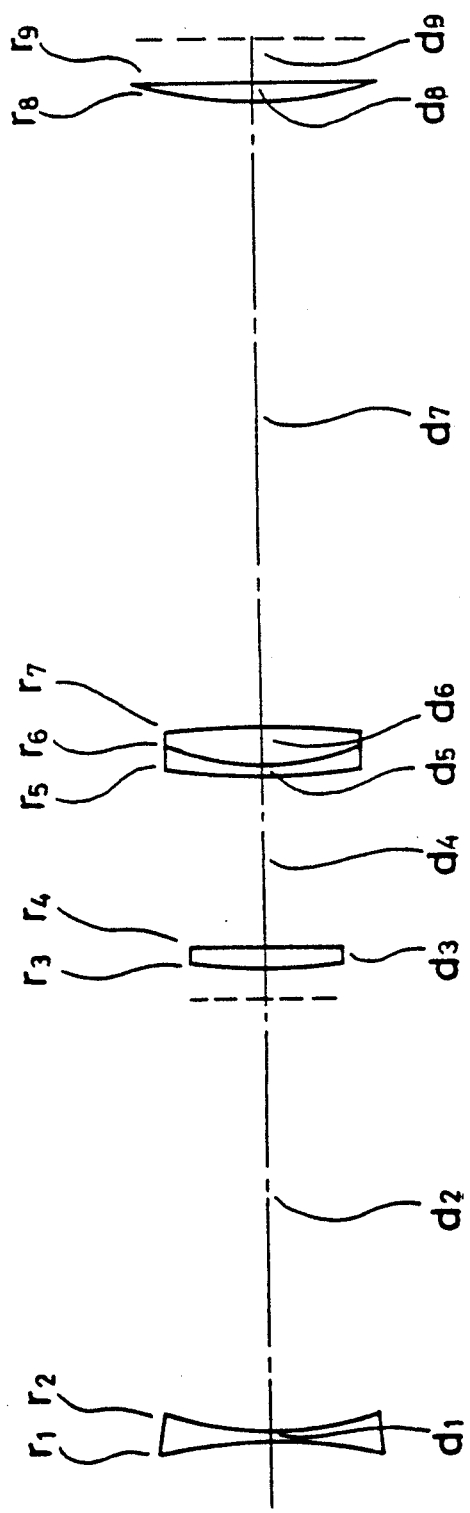
FIG. 6 illustrates a specific example of lenses in an optical system using the projector of the invention.

FIG. 6 illustrates a specific example of an optical system wherein the aforesaid two embodiments are applied.

In this example, the projecting lens 40 comprises four lenses arranged in the form of three groups, and having seven surfaces, from a first surface to a seventh surface, the condensing lens 30 comprises an eighth surface and ninth surface, and the image from the liquid crystal panel 20 is projected on a screen, not shown. In FIG. 6, only one optical system has been described for the sake of simplicity. In practice however, when these elements are assembled in an actual apparatus, a plurality of dichroic mirrors or dichroic prisms are arranged within the interval d7, and a number of condensing lenses and liquid crystal panels are provided depending on the number of images to be projected.

A specific numerical example of the optical system of FIG. 6 is shown in Table 1. In the Table, f is the focusing distance of the d-line (588 nm), r is the radius of curvature in millimeters; d is the lens thickness or the spatial distance in millimeters, n is the refractive index of the d-line, and νd is the Abbe number.

Further, both surfaces of the condensing lens 30 represented by the eighth and ninth surfaces of the optical system are aspherical surfaces. These aspherical surfaces are described by the equation appearing below, wherein the distance of a coordinate point on the aspherical surface from the contact plane at the apex of the surface is X and its height above the optical axis is Y. The curvature (1/r) at the apex of the surface is C, the coefficient of circular cone is K, and the 4th and 6th order aspherical surface coefficients are $A_4$ and $A_6$:

$$X = \frac{CY^2}{1 + \sqrt{1 - (1 + K)C^2Y^2}} + A_4 Y^4 + A_6 Y^6$$

The radii of curvature of the aspherical surfaces in Table 1 are the radii of curvature at the apices of the surfaces. The coefficients of circular cone and aspherical surface coefficients are given in Table 2.

TABLE 1

| surface number | r | d | n | νd |
|---|---|---|---|---|
| | f = 79.567 | | | |
| 1 | −115.099 | 3.000 | 1.48749 | 70.2 |
| 2 | 106.378 | 110.590 | | |
| 3 | 155.211 | 5.000 | 1.78300 | 36.1 |
| 4 | −876.560 | 40.150 | | |
| 5 | 131.974 | 2.500 | 1.80518 | 25.4 |
| 6 | 51.998 | 9.000 | 1.62299 | 58.2 |
| 7 | −342.019 | 148.146 | | |
| 8 | 52.500 | 5.000 | 1.49176 | |
| 9 | ∞ | 10.043 | | |

TABLE 2

| 8th surface | | |
|---|---|---|
| K = −121.790 | $A_4 = 7.14012 \times 10^{-6}$ | $A_6 = -3.96681 \times 10^{-9}$ |
| 9th surface | | |
| K = 0.31037 | $A_4 = 6.79693 \times 10^{-7}$ | $A_6 = 0.00000$ |

The aforesaid projection optical system is designed such that the best image is obtained when using the d-line, so focusing and magnification errors occur when other wavelengths are used. If for example an image on the liquid crystal panel is projected at a magnification of 60 times using the g-line and C-line light beams, there will be focusing errors and magnification errors corresponding to the size H of the liquid crystal panel as shown in the "before correction" column of Table 3.

Next, if corrections are made by moving the condensing lens and liquid crystal panel in the direction of the optical axis, errors can be suppressed as shown in the "after correction" column of Table 3. The amount of movement required to make the correction is as shown in Table 3 wherein the direction towards the optical source on the right hand side of the figure is considered positive:

TABLE 3

| | Before correction | | After correction | |
|---|---|---|---|---|
| | g-line | C-line | g-line | C-line |
| Focusing error | −927 mm | 839 mm | −7 mm | −7 mm |
| Magnification error | | | | |
| H = 15.24 mm | 2.16 mm | −1.11 mm | 0.39 mm | −0.07 mm |
| H = 20.32 mm | 2.69 mm | −1.45 mm | 0.11 mm | −0.05 mm |
| H = 25.40 mm | 2.83 mm | −1.78 mm | −0.42 mm | 0.11 mm |
| Amount of movement of condensing lens | | | 0.38 mm | −0.23 mm |
| Amount of movement of liquid crystal panel | | | −0.18 mm | 0.18 mm |

In this embodiment, the positions of the condensing lens and liquid crystal panel were adjusted to correct for paraxial aberration of the projecting lens 40, but adjustment can also be made to correct spherical or other aberrations.

As described above, according to the projector and image adjustment method of the present invention, image focusing errors and magnification errors caused by errors in the arrangement of optical devices, errors of precision, and color aberrations of the projection lenses, can be independently corrected by moving the image forming devices and condensing lenses.

What is claimed is:

1. A projector comprising:
   a plurality of image forming means for forming an image according to the wavelength of a light beam passing therethrough;
   a plurality of condensing lenses each defining an optical axis and corresponding to a respective one of said plurality of image forming means for converging the light beam from said respective image forming means;
   a single projecting lens for projecting the converged light beams from said condensing lenses onto a projection screen;
   light beam combining means provided between said condensing lenses and said projection lens for combining the light beams from said plurality of image forming means in order to impinge them on said projecting lens; and
   a plurality of adjusting mechanisms for supporting each of said plurality of image forming means and said condensing lenses such that they can be moved independently of each other in the direction of their respective optical axes.

2. A projector according to claim 1, wherein said image forming means are impinged by light beams of mutually differing wavelengths.

3. A projector according to claim 2, wherein said light beam combining means comprises dichroic mirrors.

4. A projector according to claim 1, wherein said adjusting mechanisms comprise adjusting units for movably supporting each of said image forming means and said condensing lenses such that they can be moved together and the relative distance between said condensing lens and said image forming means can be adjusted.

5. A projector according to claim 1, wherein said image forming means comprises a liquid crystal panel.

6. A projector comprising:
   separating means for separating a light beam from a single optical source according to the wavelength of the light beam;
   a plurality of image forming means for forming an image according to the wavelength of a light beam from said separation means;
   a plurality of condensing lenses each defining an optical axis and corresponding to a respective one of said plurality of image forming means for converging the images from said respective image forming means;
   a single projecting lens which projects the images converged by said condensing lenses onto a projection screen;
   light beam combining means provided between said condensing lenses and said projecting lens for combining the images from said plurality of image forming means so as to cause them to impinge on said projecting lens; and
   a plurality of adjusting mechanisms for movably supporting said plurality of image forming means and said condensing lenses such that they can be moved independently of each other in the direction of their respective optical axes.

7. A projector according to claim 6, wherein said image forming means comprises a liquid crystal panel.

8. An image adjustment method for use with a projector, wherein images from at least one image forming device are converged by a corresponding condensing lens that defines an optical axis, caused to impinge on a projecting lens and formed on a projection screen, comprising:
   adjusting the focus by moving said image forming device in the direction of the optical axis of said corresponding condensing lens; and
   adjusting the magnification by moving said condensing lens relative to said image forming device in the direction of the optical axis.

9. A projector according to claim 6, wherein said light beam combining means comprises a dichroic prism.

10. A projector according to claim 6, wherein one of said plurality of image forming means is provided for each light beam separated by said separating means.

* * * * *